US009476425B2

(12) United States Patent
Atherton

(10) Patent No.: US 9,476,425 B2
(45) Date of Patent: Oct. 25, 2016

(54) APPARATUS FOR MONITORING AN ELECTRICAL SUBMERSIBLE PUMP

(71) Applicant: Baker Hughes Incorporated, Houston, TX (US)

(72) Inventor: Eric Atherton, Whitney (GB)

(73) Assignee: BAKER HUGHES INCORPORATED, Houston, TX (US)

( * ) Notice: Subject to any disclaimer, the term of this patent is extended or adjusted under 35 U.S.C. 154(b) by 400 days.

(21) Appl. No.: 14/092,537

(22) Filed: Nov. 27, 2013

(65) Prior Publication Data

US 2014/0086765 A1    Mar. 27, 2014

Related U.S. Application Data

(62) Division of application No. 12/664,691, filed as application No. PCT/GB2008/001990 on Jun. 9, 2008, now Pat. No. 8,602,754.

(30) Foreign Application Priority Data

Jun. 15, 2007  (GB) .................................. 07116254

(51) Int. Cl.
F04D 15/00 (2006.01)
F04D 13/10 (2006.01)
E21B 43/12 (2006.01)
(Continued)

(52) U.S. Cl.
CPC ............. F04D 15/00 (2013.01); E21B 43/128 (2013.01); E21B 47/0007 (2013.01); F04D 13/08 (2013.01); F04D 13/10 (2013.01); F04D 15/0088 (2013.01); F04D 15/0094 (2013.01); H02K 11/21 (2016.01); H02K 5/132 (2013.01)

(58) Field of Classification Search
CPC .......... G01P 9/02; G01P 15/14; F04D 13/08; F04D 13/086; F04D 13/10; F04D 15/0094
USPC ........ 166/105, 250.15; 73/168, 493, 504.02; 417/1, 44.1, 63, 423.3
See application file for complete search history.

(56) References Cited

U.S. PATENT DOCUMENTS 3,976,919 A  8/1976 Vandevier
4,410,845 A * 10/1983 Lockyear .............. E21B 43/128
                                                                   318/368

(Continued)

FOREIGN PATENT DOCUMENTS

GB    2334275 A    8/1999
JP    0533799      9/1993

(Continued)

OTHER PUBLICATIONS

U.S. Appl. No. 12/664,691, filed May 27, 2010.

Primary Examiner — Alexander Comley
(74) Attorney, Agent, or Firm — Bracewell LLP

(57) ABSTRACT

Apparatus for monitoring an Electrical Submersible Pump (ESP) are provided, and example of an apparatus includes a rotation rate or other sensor located in, for example, an ESP gauge. When the ESP is started the rotating elements rotate in a first direction while the static elements will experience an opposing torque in a second opposite direction. The small rotational movement of the ESP gauge housing, for example, is sensed by the sensor and is used to determine the direction of rotation of the motor and pump to ensure proper ESP motor and/or ESP assembly configuration.

17 Claims, 8 Drawing Sheets

(51) Int. Cl.
*F04D 13/08* (2006.01)
*E21B 47/00* (2012.01)
*H02K 5/132* (2006.01)

(56) References Cited

U.S. PATENT DOCUMENTS

| | | | | |
|---|---|---|---|---|
| 4,667,264 | A * | 5/1987 | Yamazaki | H02H 11/004 307/127 |
| 4,689,992 | A * | 9/1987 | Strachan | G01C 19/56 310/329 |
| 4,750,364 | A * | 6/1988 | Kawamura | G01C 19/5607 73/504.04 |
| 4,922,172 | A * | 5/1990 | Roddy | G01R 31/34 318/490 |
| 4,963,804 | A * | 10/1990 | Geiger | G05D 19/02 310/51 |
| 5,038,613 | A * | 8/1991 | Takenaka | G01C 19/5607 73/493 |
| 5,126,641 | A | 6/1992 | Putman | |
| 5,198,734 | A * | 3/1993 | Johnson | H02P 3/24 318/275 |
| 5,252,031 | A | 10/1993 | Gibbs | |
| 5,336,996 | A | 8/1994 | Rusnak | |
| 5,533,400 | A * | 7/1996 | Gasch | G01H 1/003 73/593 |
| 5,708,337 | A * | 1/1998 | Breit | H02P 6/182 318/400.09 |
| 5,931,044 | A * | 8/1999 | Robert | G01L 5/0061 73/168 |
| 5,973,465 | A * | 10/1999 | Rayner | F04B 47/06 318/459 |
| 6,167,965 | B1 | 1/2001 | Bearden | |
| 6,474,162 | B1 * | 11/2002 | Voss | G01C 19/5614 310/370 |
| 6,876,167 | B1 * | 4/2005 | Jones | G01P 3/48 318/461 |
| 2002/0066568 | A1 | 6/2002 | Buchanan | |
| 2004/0251027 | A1 | 12/2004 | Sonnier | |
| 2005/0281681 | A1 | 12/2005 | Anderson | |
| 2006/0266526 | A1 * | 11/2006 | Ocalan | E21B 43/128 166/370 |
| 2010/0191484 | A1 * | 7/2010 | Schoonover | G01 15/00 702/56 |
| 2010/0247335 | A1 | 9/2010 | Atherton | |

FOREIGN PATENT DOCUMENTS

| | | |
|---|---|---|
| JP | 2001153085 A | 6/2001 |
| WO | WO9856104 A | 12/1998 |
| WO | WO2004113670 A | 12/2004 |
| WO | WO2006102981 A | 10/2006 |

* cited by examiner

APPARATUS FOR MONITORING AN ELECTRICAL SUBMERSIBLE PUMP

RELATED APPLICATIONS

This application is a divisional application of and claims priority to and the benefit of U.S. patent application Ser. No. 12/664,691, filed on May 27, 2010, which claims priority to and the benefit of PCT Patent Application No. PCT/GB 2008/001990, which claims priority to and the benefit of United Kingdom Application 071-1625.4, filed Jun. 15, 2007, each incorporated by reference in its entirety.

BACKGROUND OF THE INVENTION

1. Field of the Invention

The present invention relates to apparatus for monitoring an Electrical Submersible Pump and a method of monitoring an Electrical Submersible Pump (ESP). More particularly, the present invention relates to apparatus and methods to determine a direction of rotation of a motor and/or a pump of an ESP.

2. Description of the Related Art

Electrical Submersible Pumps typically include an electric motor which drives a centrifugal pump. The electric motor and associated centrifugal pump are located in a subsurface well and the centrifugal pump enables or improves the flow of fluid from the well to the surface. The motor section of the Electrical Submersible Pump is powered by a cable which runs from a surface power source down the well to the motor section of the Electrical Submersible Pump.

It is known more generally to monitor electric motors and machinery driven by electric motors (such as centrifugal pumps) using a translational vibration sensor or accelerometer. A translational vibration sensor or accelerometer measures the translational acceleration in one or more of three orthogonal axes which are commonly referred to as the x, y and z directions. Information from the translational vibration sensor or accelerometer can be analysed to provide advance warning of potential failure of a component of the motor or machinery such as bearing failure. The information may also be used to schedule maintenance of the motor or machinery thereby preventing emergency maintenance after an unscheduled system failure.

If the motor or machinery is located in a readily accessible location then data may be gathered from the translational vibration sensor or accelerometer at a relatively rapid sample rate. The data may be stored and subsequently analysed by a computer. The high sample rate data may be converted from time-series data to frequency-series data using Fast Fourier Transform techniques thereby improving diagnostics.

However, other forms of rotating machinery such as Electrical Submersible Pumps may be located in a remote location which is relatively inaccessible. It is particularly problematic to attempt to obtain high sample rate data from a translational vibration sensor or accelerometer located in an Electrical Submersible Pump because of bandwidth limitations between the subsurface location where the Electrical Submersible Pump is located and the data acquisition system which is located at the surface.

It is known to use a translational vibration sensor or accelerometer to monitor an Electrical Submersible Pump located in an oilwell. An ESP gauge is known, for example, which monitors translational vibration (i.e. vibration from side to side). However, the ESP gauge only gives a limited amount of information about the status of the Electrical Submersible Pump. It is recognised that there is a high cost of lost production in the event that the Electrical Submersible Pump fails. The known ESP gauge communicates with the surface using the same power cable that is used to power the motor section of the Electrical Submersible Pump from the surface. The use of a single cable to provide both electrical power to the Electrical Submersible Pump from the surface and also to provide a communications route from the ESP gauge to the surface saves a considerable amount of cost which would otherwise be involved in running an extra cable into the well. However, a significant disadvantage of using a single cable to provide both electrical power and a communications route is that the bandwidth available to the ESP gauge is severely limited. As a result, the ESP gauge is restricted to sending a translational vibration reading to the surface approximately once every minute. The reading may be an average reading or a peak-to-peak reading.

The motor of a typical conventional oilfield Electrical Submersible Pump comprises a 3-phase motor driven from the surface via a 3-phase power cable. The direction of rotation of the Electrical Submersible Pump will be determined by the wiring of the 3-phase power cables which run from the surface downhole. If any two phases of a power cable is inadvertently swapped at any point between the surface and the Electrical Submersible Pump then the motor and associated pump will rotate in the opposite direction to that intended. As will be understood by those skilled in the art, the direction of rotation of an Electrical Submersible Pump is particularly important since the pump section of an Electrical Submersible Pump is only efficient when the pump is rotating in its designed or intended direction of rotation. Although an Electrical Submersible Pump will still pump fluid to a limited extent if the pump is rotated in the wrong direction, the efficiency of the pump will be severely reduced. Furthermore, if an Electrical Submersible Pump is rotated in the wrong direction for any significant period of time then the Electrical Submersible Pump is likely to overheat and the pump is likely to suffer accelerated mechanical failure.

In practical oilfield installations there is no certainty that the 3-phase power cable for an Electrical Submersible Pump has been wired correctly along the entire electrical path from the surface electrical power source to the downhole Electrical Submersible Pump motor. As a result, sometimes a newly installed Electrical Submersible Pump will inadvertently rotate in the wrong direction which can be particularly problematic if this is undetected for any significant period of time.

A known approach to this problem is to start the motor in both directions and then to compare the resulting pressure generated by the pump when the pump is rotated in both directions. It can then be determined whether or not the Electrical Submersible Pump has been correctly installed. However, this procedure is relatively time consuming. Furthermore, if the Electrical Submersible Pump has been installed correctly then the procedure imposes unnecessary and undesirable stresses upon the pump which can reduce the operating lifetime of the pump.

It is known to use a shaft rotation detector to determine the rotation direction of a motor and pump. However, placing a shaft rotation detector inside a motor or pump section significantly increases the overall mechanical complexity of the motor and pump sections and increases the risk of the pump failing.

It is desired to provide an improved apparatus including, for example, an Electrical Submersible Pump assembly including an associated pump, motor, properly configured conductors and/or umbilicals, and a processing system configured to ensure that the assembly is configured so that the motor and associated pump rotate in an intended direction.

SUMMARY OF THE INVENTION

In view of the foregoing, various embodiments of the present invention advantageously provide apparatus including an electrical submersible pump assembly and processing system configured to ensure that the motor and pump rotate in an intended direction.

More specifically, according to an aspect of an embodiment of the present invention, the exemplary apparatus can include an electrical submersible pump assembly having a motor, a pump, a housing, and at least one sensor positioned to measure a rotational rate of, for example, the housing. The at least one sensor can include: a rotation rate, an angular rate, and/or a rotational acceleration sensor or sensors. The apparatus can also include a processing system being configured to determine an, e.g., initial direction of rotation of the pump, the motor, or both the pump and motor responsive to a signal output from the at least one sensor to thereby determine if the pump of the electrical submersible pump is rotating in a design-intended direction.

According to another aspect, an exemplary apparatus can include an electrical submersible pump assembly including a motor, a pump, a housing, and at least one sensor positioned to measure a rotational rate, and a processing system being configured to perform the operations of: determining whether a time-dependent signal output from the at least one sensor indicates a first value matching or exceeding a first threshold and whether the time-dependent signal output from the at least one sensor indicates a second value matching or exceeding a second threshold; and determining a direction of rotation of the motor responsive to the time-dependent signal output from the at least one sensor to thereby determine if the pump, the motor, or both the pump and motor of the electrical submersible pump is rotating in an intended direction.

The processing system can be further configured such that: when the time-dependent signal output from the at least one sensor indicates the first value matching or exceeding the first threshold is reached before the second value matching or exceeding the second threshold is reached, the processing system determines a direction of rotation of the pump, the motor, or both the pump and motor to be in the intended direction; and when the time-dependent signal output from the at least one sensor indicates the second value matching or exceeding the second threshold is reached before the first value matching or exceeding the first threshold is reached, the processing system determines the direction of rotation of the pump, the motor, or both the pump and motor to be in a direction opposite the intended direction.

According to another aspect, the processing system is alternatively configured such that: when the first value matching or exceeding the first threshold is reached before the second value matching or exceeding the second threshold is reached, the processing system determines a direction of rotation of the pump, the motor, or both the pump and motor to be in a counter-clockwise direction, and when the second value matching or exceeding the second threshold is reached before the first value matching or exceeding the first threshold is reached, the processing system determines the direction of rotation of the pump, the motor, or both the pump and motor to be in a clockwise direction.

According to another aspect, either of the alternative embodiments the first threshold has a positive value related to a maximum positive value indicated by the signal output of the at least one sensor, and wherein the second threshold has a negative value related to a maximum negative value indicated by the signal output of the at least one sensor.

According to another aspect, either of the alternative embodiments the processing system is further configured to determine one or more detection quality factors, and wherein a detection quality factor includes a ratio of a maximum detected rotation rate during a second time period T2 to a maximum detected rotation rate during a first time period T1 and a ratio of a maximum detected rotation rate during the second time period T2 to a maximum detected rotation rate during a third time period T3, wherein T3>T2>T1.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
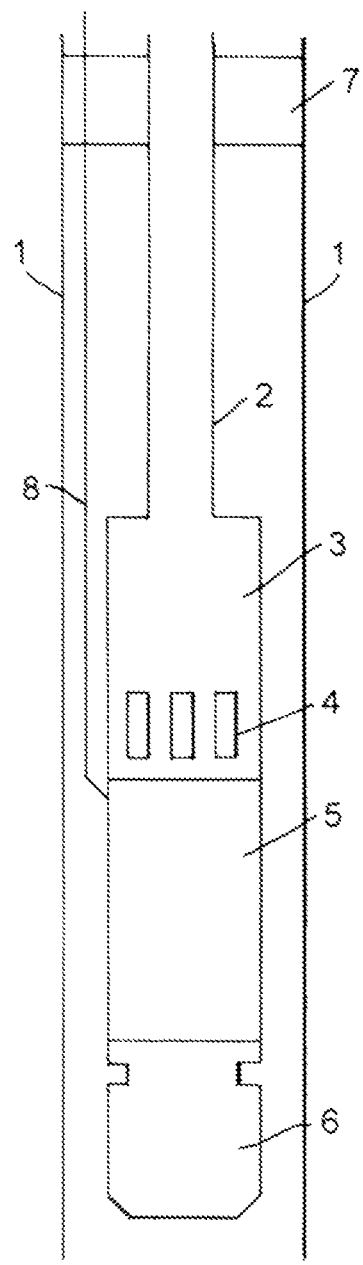
FIG. 1 shows an Electrical Submersible Pump assembly including an ESP gauge located in a subsurface well.

An embodiment of the present invention will now be described with reference to FIG. 1. An Electrical Submersible Pump ("ESP") is shown which comprises a 3-phase electric motor section 5 mounted below a multistage centrifugal pump section 3. The Electrical Submersible Pump is preferably suspended vertically by tubing or production tubing 2 in a cylindrical oil well casing 1. The tubing 2 is preferably positioned and located centrally within the casing 1 and the annular space between the tubing 2 and the casing 1 is preferably sealed by a packer 7.

An ESP gauge 6 is preferably mounted to the bottom of the motor section 5. The ESP gauge 6 preferably comprises instrumentation and a processing system which preferably monitors the operation of the motor 5 and the pump 3. A three phase power cable 8 preferably carries power from the surface to the motor 5. The power cable 8 preferably passes through the packer 7.

The instrumentation within the ESP gauge 6 is preferably electrically connected to the motor section 5. The ESP gauge 6 preferably receives electrical power from the surface via the motor section 5. The instrumentation and the processing system within the ESP gauge 6 preferably periodically transmits sensor data to the surface via the power cable 8.

A vertical shaft (not shown) within the pump section 3 is preferably rotated by a vertical shaft (not shown) within the motor section 5. The two shafts are preferably connected together when the pump 3 and the motor 5 are assembled. The rotor and shaft of the motor 5 and the impellors and shaft of the pump 3 have rotational inertia so that in order to change the speed of rotation of the rotating elements a net torque must be applied to the rotating elements (in an analogous manner to the force required to accelerate a mass in linear motion). The application of torque in order to change the rotational speed of the rotating elements will result in an equal and opposite torque being exerted upon the static elements of the motor 5 and the pump 3 (i.e. the housing of the Electrical Submersible Pump). The equal and opposite torque exerted upon the housing of the Electrical Submersible Pump will initially cause the housing to twist or rotate. The torque exerted upon the housing will eventually be counteracted by a restoring torque in the tubing 2. The size of the restoring torque will depend upon the amount of rotation of the housing of the Electrical Submersible Pump, the rotational stiffness of the tubing 2 and the length of the tubing 2 from the attachment point at the packer 7. Depending upon the level of frictional damping between the Electrical Submersible Pump and the casing 1, the restoring torque in the tubing 2 may cause the Electrical Submersible Pump to oscillate about a vertical axis after the impulse of the starting torque.

The ESP gauge 6 preferably contains a rotation rate or angular rate sensor which may, for example, comprise a ADXRS401 sensor which is available from Analog Devices Inc.®. The rotation rate or angular rate sensor preferably comprises an angular rate sensing gyroscope which may be integrated with associated electronics onto a single chip. The sensor is preferably sensitive to rotation rate about a particular axis. The sensor is preferably positioned within the ESP gauge 6 so that the axis of sensitivity preferably corresponds with the vertical axis of the ESP gauge 6 and hence also with the axis of rotation of the motor 5 and the pump 3.

The signal from the rotation rate or angular rate sensor is preferably digitised 100 times per second. The digitised signal is then preferably processed by a microprocessor which is preferably located or housed within the ESP gauge 6. The signal is preferably processed so that three numbers are preferably made available for transmission to the surface from time to time. The numbers are preferably transmitted via the power cable 8. The numbers preferably provide information concerning any rotational speed change or direction of rotation change of the downhole Electrical Submersible Pump. The numbers transmitted preferably also provide information as to the general level of rotational vibration experienced by the downhole Electrical Submersible Pump.

Figure 2:
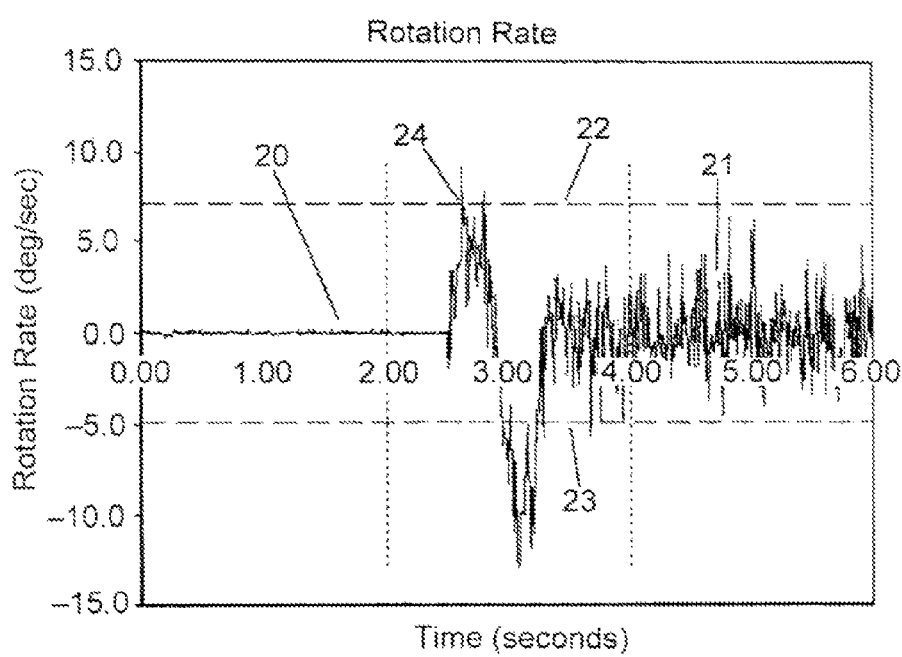
FIG. 2 shows a plot of the rotation rate of the housing of an ESP gauge as a function of time as measured by a rotation rate sensor within the ESP gauge when the motor initially starts rotating in a clockwise direction.

FIG. 2 shows a graph of the signal from a rotation rate or angular rate sensor located within an ESP gauge 6 according to an embodiment of the present invention. The signal has been plotted over a six second time interval. The vertical axis corresponds with the rotation rate and is in units, of degrees/second and the horizontal axis corresponds with time and is in units of seconds. The plot correspond to 600 separate sensor readings obtained at 0.01 second intervals. An upper threshold marker line 22, a lower threshold marker line 23, a vertical two second scale line and a vertical four second scale line are shown in FIG. 2.

The signal trace as shown in FIG. 2 was recorded during a period when the motor of an Electrical Submersible Pump was initially started. When the motor was at rest a first relatively low noise level 20 was observed. The first noise level 20 was observed to be less than 0.1 deg/s over a time period lasting from 0 to 2.5 seconds. After the motor was started and once the motor was stabilised rotating at a desired speed, a second relatively high noise level 21 was observed. The motor started building up speed during the time period from 2.5 to 3.25 seconds. A rapid initial rotation rate was observed followed by a subsequent rotation in the opposite direction as the motor speed stabilises and the tubing 2 attempts to restore the Electrical Submersible Pump to approximately its former orientation.

The six second period can be divided up into three separate time frames. The first time frame is from 0-2 seconds, the second time frame is from 2-4 seconds and the third time frame is from 4-6 seconds. The maximum and minimum values of the signal in each of these three separate time frames may be extracted from the set of readings. The upper threshold level 22 was set to be 110% of the greater of either the maximum value during the first time frame or the maximum value during the third time frame. The lower threshold level 23 was set at 110% of the lower of either the maximum negative value during the first time frame or the maximum negative value during the third time frame.

According to an exemplary embodiment, the values or sensor data in the second time frame are preferably searched for the first occurrence 24 when either a rotation rate greater than the upper threshold level 22 or a rotation rate lower than the lower threshold level 23 occurs. If the first occurrence 24 corresponds with a rotation rate which is greater than the upper threshold level 22 then a rotation in a clockwise (CW) direction is reported. The direction of rotation is arbitrarily taken to be clockwise (CW) or counter clockwise (CCW) as viewed from below the motor. In the context of motor start up if the initial direction of rotation is determined as being positive then this indicates that the motor 5 has started rotating in a clockwise direction.

The same approach may also be used to determine and/or confirm the direction of rotation of the motor 5 during a change in speed as will be discussed in more detail below. An initial positive rotation may indicate either: (i) that the motor has started rotating in a clockwise direction; (ii) that the motor has speeded up or accelerated whilst rotating in a clockwise direction; (iii) that the motor has slowed down or decelerated whilst rotating in a counter clockwise direction; or (iv) that the motor has stopped whilst previously rotating in a counter clockwise direction.

With reference to FIG. 2, the direction of rotation is reported as being 1 or positive which preferably indicates that the motor has started and increased speed in a clockwise direction. A detection quality factor of 1.5 was reported which is an indication of how much reliance can be placed upon the determined direction of rotation. The quality factor may be computed as relating to the smallest of either: (a) the highest positive peak in the first, second or third sections; or (b) the lowest negative peak in the first, second or third sections.

More preferably, a quality factor may be determined which looks at the ratio of the size of the rotation rate signal in the second time frame to either the size of the rotation rate signal in the first time frame or the third time frame. According to a particularly preferred embodiment a first ratio of the highest positive peak in the second time frame is calculated relative to the highest positive peak in either the first or third time frames. Likewise, a second ratio of the lowest negative peak in the second time frame is calculated relative to the lowest negative peak in either the first or third time frames. The first and second ratios are preferably compared and the worst ratio is preferably reported as the quality factor.

The third number which is preferably reported to the surface is preferably a measure of the maximum rotational noise. For the example shown in FIG. 2, the rotational noise was determined as being 22.3 peak to peak deg/s/s. The rotational noise is preferably determined as the maximum peak to peak value that occurred during any of the three time frames. Other embodiments are contemplated wherein other measures of the rotational noise may be determined including the determined RMS noise.

Figure 3:
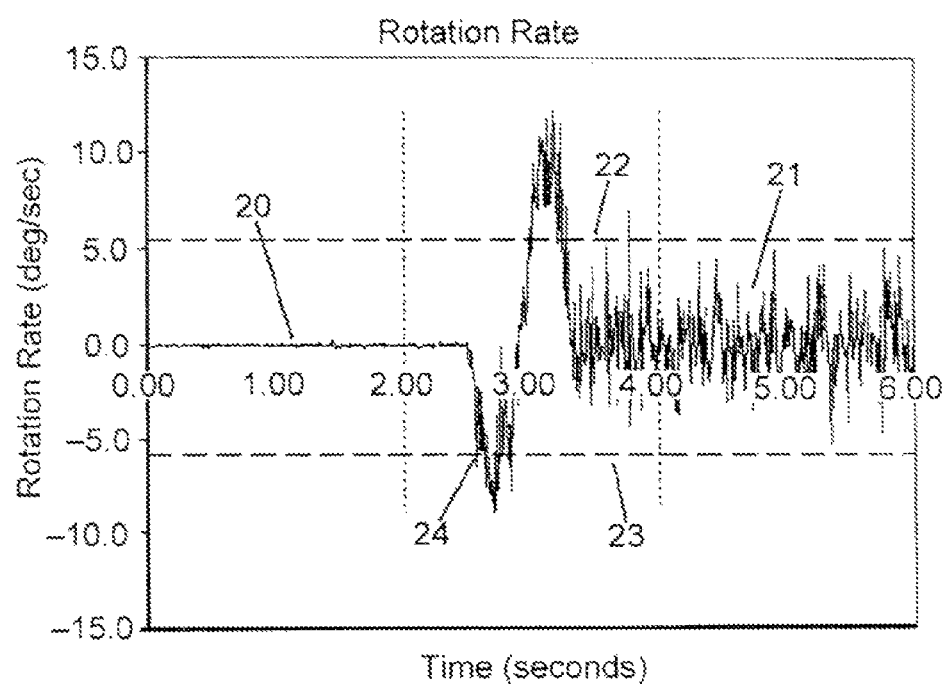
FIG. 3 shows a plot of the rotation rate of the housing of an ESP gauge as a function of time as measured by a rotation rate sensor within the ESP gauge when the motor initially starts rotating in a counter clockwise direction.

FIG. 3 shows an example wherein the rotation rate or angular rate signal shows an initial kick in the opposite direction to the example shown in FIG. 2. The first occurrence 24 when the signal crosses either the upper threshold marker 22 or the lower threshold marker 23 occurs with the rotation rate crossing the lower threshold marker 23. Therefore, a negative or counter clockwise direction of rotation is reported. With the example shown in FIG. 3, a detected direction value of −1 is preferably reported which preferably indicates an initial counter clockwise rotation. The detection quality factor was determined as being 1.7 and the rotational noise was determined as being 21.2 peak to peak deg/s/s.

Figure 4:
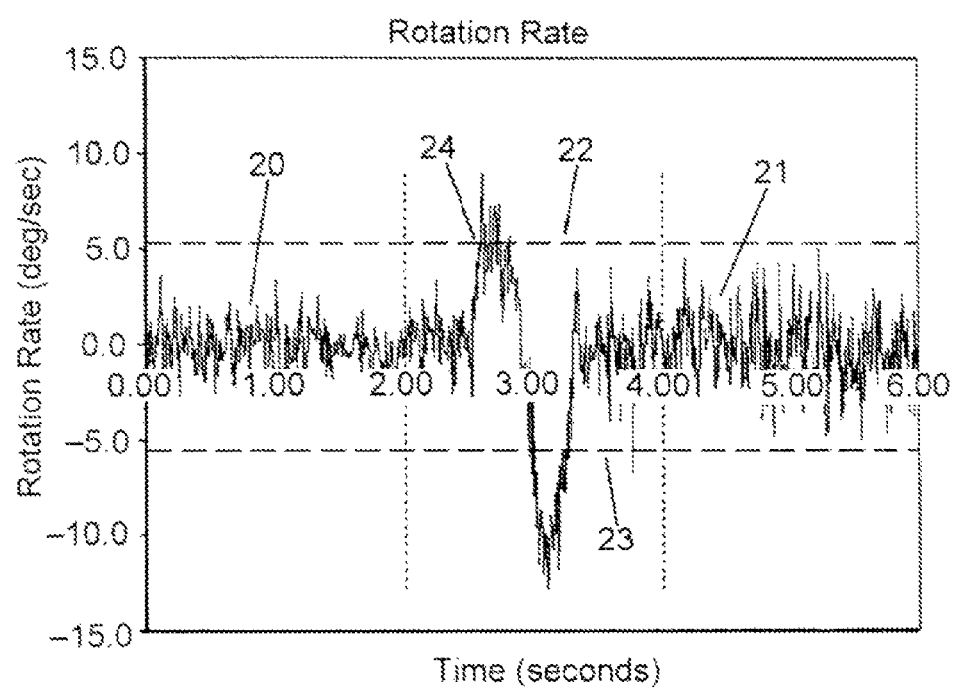
FIG. 4 shows a plot of the rotation rate of the housing of an ESP gauge as a function of time as measured by a rotation rate sensor within the ESP gauge when the motor is accelerated clockwise from 50 Hz to 60 Hz.

FIG. 4 shows a plot of the rotation rate signal as a function of time when a motor rotating in a clockwise direction was accelerated from 50 Hz to 60 Hz. It is apparent from FIG. 4 that the motor 5 is already rotating prior to being accelerated due to the relatively high noise level 20 which is evident during the first time frame. The first occurrence 24 when the rotation rate exceeds either the upper threshold 22 or the lower threshold 23 occurs when the rotation rate exceeds the upper threshold 22. The detected direction is determined as being positive or clokwise indicating that the motor was accelerated in a clockwise direction. The detection quality factor was determined as being 1.8 and the rotational noise was determined as being 21.9 peak to peak deg/s/s.

Figure 5:
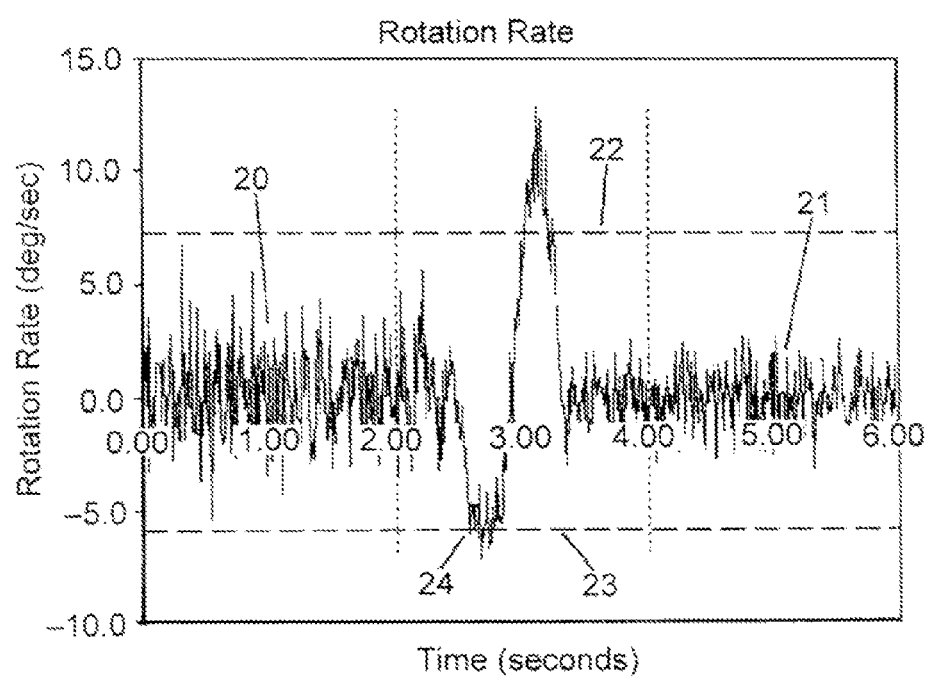
FIG. 5 shows a plot of the rotation rate of the housing of an ESP gauge as a function of time as measured by a rotation rate sensor within the ESP gauge when the motor is decelerated clockwise from 60 Hz to 50 Hz.

FIG. 5 shows the rotation rate signal obtained as a function of time when a motor running in a clockwise direction was decelerated from 60 Hz to 50 Hz. The first occurrence 24 when the rotation rate exceeded either the upper threshold 22 or the lower threshold 23 occurs when the rotation rate exceeds the lower threshold 23. The detected direction was determined as being negative or counter clockwise indicating that the motor decelerated whilst rotating in a clockwise direction.

According to an embodiment the speed of rotation of the motor of the Electrical Submersible Pump may be switched one or more times between two or more different drive frequencies e.g. between 50 Hz and 60 Hz. The rotation rate signal may be analysed to determine and/or confirm that the motor is rotating in the intended direction. If the indicated or determined direction of rotation of the motor consistently indicates a positive value or clockwise direction for a speed increase and a negative value or counter clockwise direction for a speed decrease then the direction of rotation of the motor can be determined as being clockwise with a very high degree of confidence. Similarly, if the indicated or determined direction of rotation of the motor consistently indicates a negative value or counter clockwise direction for a speed increase and a positive value or clockwise direction for a speed decrease then the direction of rotation of the motor can be determined as being counter clockwise with a very high level of confidence.

According to an exemplary embodiment, three numbers may be reported to the surface. The three numbers preferably relate to the detected direction of rotation, the detection quality factor and the rotational noise. The numbers may be reported to the surface, for example, once every 30 seconds. The downhole processor may according to an embodiment compute the three numbers every 0.5 seconds using the most recent six seconds of data. The processor preferably retains the set of numbers having the highest quality factor until it is time to transmit a set of numbers to the surface. Thus, the highest quality motor start data and/or the highest quality motor speed change data is preferably sent to the surface.

Figure 6:
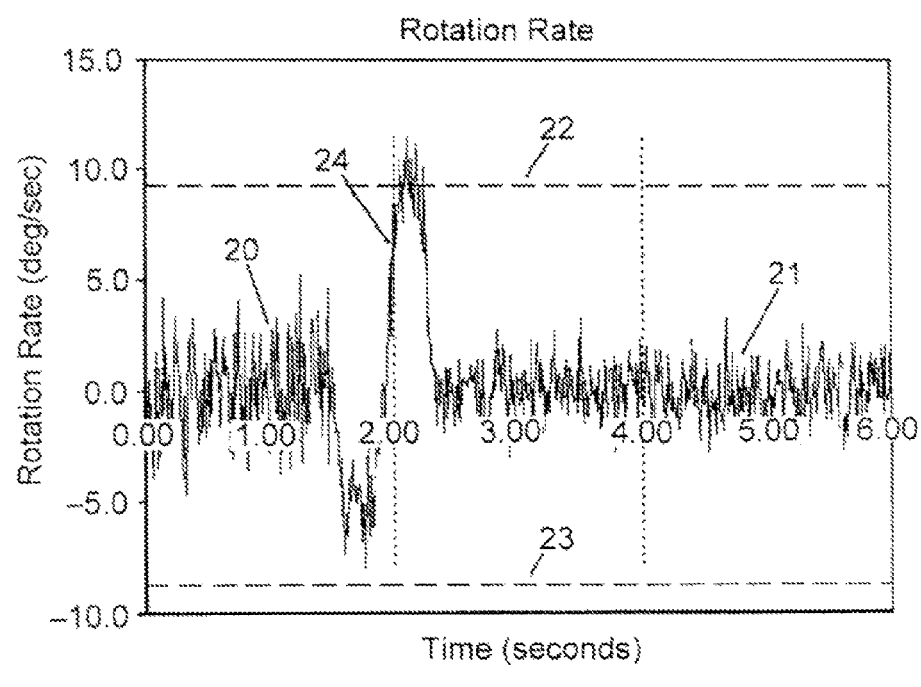
FIG. 6 shows a plot of the rotation rate of the housing of an ESP gauge as a function of time as measured by a rotation rate sensor within the ESP gauge when the motor is decelerated clockwise from 60 Hz to 50 Hz at an earlier time than the example shown in FIG. 5.

FIG. 6 shows data corresponding to the same speed change as shown in FIG. 5 (i.e. a decrease in the rotation rate from 60 Hz to 50 Hz) but wherein the time that the speed change occurred was one second earlier in the six second time window compared with the data shown in FIG. 5. As a result, the speed change is now no longer captured within the second time frame. The detection quality factor is reduced to 0.4 which is relatively poor compared with the detection quality factor of 1.3 which was obtained for the data shown in FIG. 5. Accordingly, the downhole processor will preferably discard the three numerical outputs produced by processing the data shown in FIG. 6 in favour of the numerical outputs produced by processing the data shown in FIG. 5 due to the higher detection quality factor returned for the data shown in FIG. 5.

According to an exemplary embodiment, the numerical data output from the downhole processor preferably enables the initial direction of rotation and/or the subsequent direction of rotation of the Electrical Submersible Pump to be determined and/or confirmed.

According to another embodiment the numerical data transmitted to the surface may additionally and/or alternatively be used to improve or optimise the operating point, operating conditions or rotational speed of the Electrical Submersible Pump.

Figure 7:
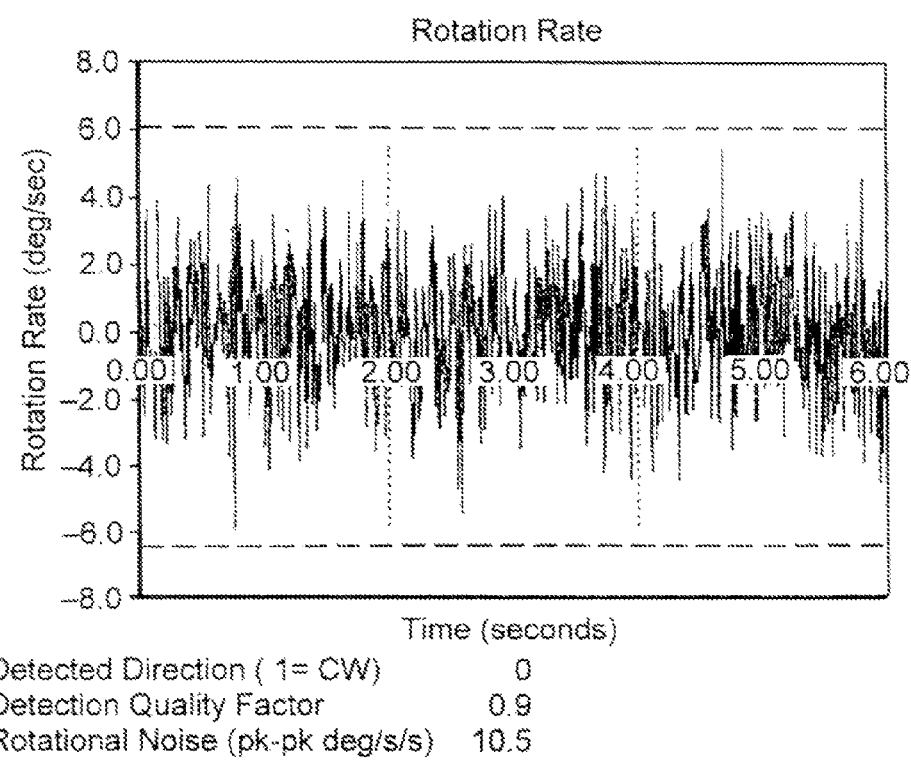
FIG. 7 shows a plot of the rotational vibration as a function of time as measured by a rotation rate sensor within an ESP gauge when the motor is rotated at a constant speed of 60 Hz.
Figure 8:
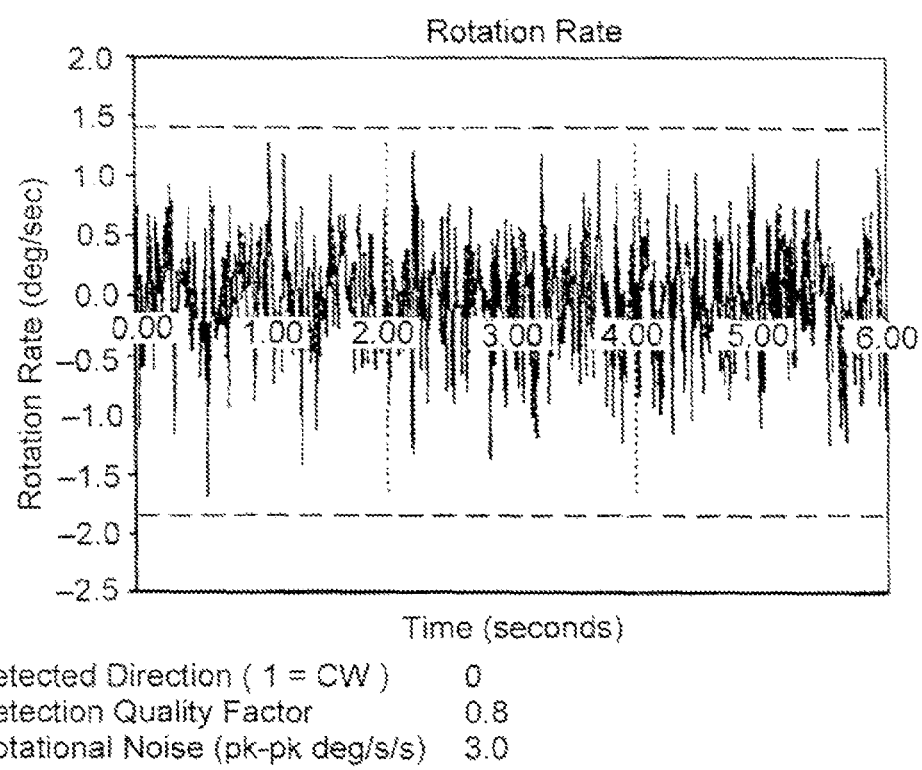
FIG. 8 shows a plot of the rotational vibration as a function of time as measured by a rotation rate sensor within an ESP gauge when the motor is rotated at a constant speed of 61 Hz.

FIG. 7 shows a rotation rate signal as a function of time which was obtained whilst a motor was rotating at a constant speed of 60 Hz. FIG. 8 shows a rotation rate signal as a function of time which was obtained whilst the motor was rotating at a constant speed of 61 Hz. It should be noted that the scale in FIG. 7 is different to the scale in FIG. 8. It can be seen from FIG. 7 and the associated data values that at 60 Hz rotation the rotational noise was determined as being 10.5 peak to peak deg/s/s whereas at the slightly faster drive speed of 61 Hz the rotational noise was determined as having dropped to 3.0 peak to peak deg/s/s. It will therefore be apparent that operating the Electrical Submersible Pump at the slightly faster drive speed of 61 Hz will have a positive effect in terms of increasing the potential run life of the motor and/or pump since when the Electrical Submersible Pump was rotated at 60 Hz the Electrical Submersible Pump suffered from resonance effects. Embodiments of the present invention are contemplated wherein the rotational rate of the motor and/or pump may be swept or scanned and the rotational noise at each speed may be determined. The rotational noise as a function of rotational speed can therefore be determined or mapped and the control system may cause the motor and/or pump to rotate at a speed substantially different from one or more speeds which are determined as being sub-optimal or disadvantageous and/or the control system may cause the motor and/or pump to rotate at one or more speeds which are determined as being optimal or advantageous.

Various further embodiments are contemplated. For example, according to an embodiment one or more optical fibres or optical communication paths may be provided between the ESP gauge and the surface. According to this embodiment a high bandwidth data transmission path is provided between the ESP gauge and the surface enabling the sensor data to be analysed by a processing system at the surface in real time. Other embodiments are also contemplated wherein other high bandwidth communication channels such as an electrical cable are provided between the ESP gauge and the surface.

Although the present invention has been described with reference to preferred embodiments, it will be understood by those skilled in the art that various changes in form and detail may be made to the particular embodiments discussed above without departing from the scope of the invention as set forth in the accompanying claims.

According to an aspect of the present invention there is provided apparatus comprising:

An Electrical Submersible Pump comprising a motor, a pump and at least one sensor, wherein the at least one sensor comprises a rotation rate or angular rate sensor and/or a rotational acceleration sensor; and A processing system arranged and adapted to determine an initial direction of rotation of the motor and/or the pump from a signal output from the at least one sensor.

According to an exemplary embodiment, the sensor comprises a rotation rate sensor or a rotational acceleration sensor. Such sensors are substantially different to accelerometers and shaft rotation detectors.

The processing system is preferably arranged and adapted to determine whether a signal output from the sensor first approaches and/or exceeds a first signal level or threshold or a second signal level or threshold. The first signal level or threshold and/or the second signal level or threshold is preferably set x % above or below a maximum or minimum rotation rate detected during a time period, wherein x is preferably selected from the group consisting of: (i) <5; (ii) 5-10; (iii) 10-15; (iv) 15-20; (v) 20-25; (vi) 25-30; (vii) 30-35; (viii) 35-40; (ix) 40-45; (x) 45-50; (xi) 50-55; (xii) 55-60; (xiii) 60-65; (xiv) 65-70; (xv) 70-75; (xvi) 75-80; (xvii) 80-85; (xviii) 85-90; (xix) 90-95; (xx) 95-100; and (xxi) >100.

According to an embodiment the first signal level or threshold may have a positive value and/or the first signal level or threshold may in a mode of operation be set at a value selected from the group consisting of: (i) <1 deg/sec; (ii) 1-2 deg/sec; (iii) 2-3 deg/sec; (iv) 3-4 deg/sec; (v) 4-5 deg/sec; (vi) 5-6 deg/sec; (vii) 6-7 deg/sec; (viii) 7-8 deg/sec; (ix) 8-9 deg/sec; (x) 9-10 deg/sec; (xi) 10-11 deg/sec; (xii) 11-12 deg/sec; (xiii) 12-13 deg/sec; (xiv) 13-14 deg/sec; (xv) 14-15 deg/sec; (xvi) 15-16 deg/sec; (xvii) 16-17 deg/sec; (xviii) 17-18 deg/sec; (xix) 18-19 deg/sec; (xx) 19-20 deg/sec; (xxi) 20-25 deg/sec; (xxii) 25-30 deg/sec; (xxiii) 30-35 deg/sec; (xxiv) 35-40 deg/sec; (xxv) 40-45 deg/sec; (xxvi) 45-50 deg/sec; (xxvii) 50-55 deg/sec; (xxviii) 55-60 deg/sec; (xxix) 60-65 deg/sec; (xxx) 65-70 deg/sec; (xxxi) 70-75 deg/sec; (xxxii) 75-80 deg/sec; (xxxiii) 80-85 deg/sec; (xxxiv) 85-90 deg/sec; (xxxv) 90-95 deg/sec; (xxxvi) 95-100 deg/sec; and (xxxvii) >100 deg/sec.

The second signal level or threshold may have a negative value and/or the second signal level or threshold may in a mode of operation be set at a value selected from the group consisting of: (i) >−1 deg/sec; (ii) −1 to −2 deg/sec; (iii) −2 to −3 deg/sec; (iv) −3 to −4 deg/sec; (v) −4 to −5 deg/sec; (vi) −5 to −6 deg/sec; (vii) −6 to −7 deg/sec; (viii) −7 to −8 deg/sec; (ix) −8 to −9 deg/sec; (x) −9 to −10 deg/sec; (xi) −10 to −11 deg/sec; (xii) −11 to −12 deg/sec; (xiii) −12 to −13 deg/sec; (xiv) −13 to −14 deg/sec; (xv) −14 to −15 deg/sec; (xvi) −15 to −16 deg/sec; (xvii) −16 to −17 deg/sec; (xviii) −17 to −18 deg/sec; (xix) −18 to −19 deg/sec; (xx) −19 to −20 deg/sec; (xxi) −20 to −25 deg/sec; (xxii) −25 to −30 deg/sec; (xxiii) −30 to −35 deg/sec; (xxiv) −35 to −40 deg/sec; (xxv) −40 to −45 deg/sec; (xxvi) −45 to −50 deg/sec; (xxvii) −50 to −55 deg/sec; (xxviii) −55 to −60 deg/sec; (xxix) −60 to −65 deg/sec; (xxx) −65 to −70 deg/sec; (xxxi) −70 to −75 deg/sec; (xxxii) −75 to −80 deg/sec; (xxxiii) −80 to −85 deg/sec; (xxxiv) −85 to −90 deg/sec; (xxxv) −90 to −95 deg/sec; (xxxvi) −95 to −100 deg/sec; and (xxxvii) <−100 deg/sec.

According to an embodiment if the processing system determines that the signal output from the sensor exceeds the first signal level or threshold before the second signal level or threshold then the processing system preferably determines that the motor and/or the pump is rotating in a first or clockwise direction. According to an embodiment if the processing system determines that the signal output from the sensor exceeds the second signal level or threshold before the first signal level or threshold then the processing system preferably determines that the motor and/or the pump is rotating in a second or counter clockwise direction.

The processing system is preferably additionally arranged and adapted to determine one or more detection quality factors. A detection quality factor is preferably determined as being the ratio of a maximum detected rotation rate during a second time period T2 to a maximum detected rotation rate during a first time period T1 and/or a third time period T3, wherein T3>T2>T1. The processing system is preferably additionally arranged and adapted to determine one or more measures of the rotational noise at a given point in time or during a time period. The processing system may determine, in use, the peak to peak and/or RMS rotational noise at a given point in time or during a time period.

According to another aspect of the present invention there is provided apparatus comprising:

An Electrical Submersible Pump comprising a motor, a pump and at least one sensor, wherein the at least one sensor comprises a rotation rate or angular rate sensor and/or a rotational acceleration sensor; and A control and processing system which in a mode of operation is arranged and adapted:

(i) to accelerate the motor and/or the pump and then determine the direction of rotation of the motor and/or the pump; and (ii) to decelerate the motor and/or the pump and then determine the direction of rotation of the motor and/or the pump.

The direction of the motor and/or the pump is left unchanged when the motor and/or the pump is/are accelerated and decelerated.

The control system is preferably, arranged and adapted to accelerate the motor and/or the pump and then decelerate the motor and/or the pump. Alternatively, the control system may be arranged and adapted to decelerate the motor and/or the pump and then accelerate the motor and/or the pump. The processing system is preferably arranged to determine, confirm or verify the direction of rotation of the motor and/or the pump.

According to another aspect of the present invention there is provided apparatus comprising:

an Electrical Submersible Pump comprising a motor, a pump and at least one sensor, wherein the at least one sensor comprises a rotation rate or angular rate sensor and/or a rotational acceleration sensor;

a control system which is arranged and adapted to change, vary, sweep or scan the rotational rate of the motor and/or the pump; and a processing system which determines in use:

(i) one or more optimal or advantageous rotational rates for the motor and/or the pump from a signal output from the at least one sensor; and/or (ii) one or more sub-optimal or disadvantageous rotational rates for the motor and/or the pump from a signal output from the at least one sensor.

The control system is preferably arranged and adapted to cause the motor and/or the pump to rotate at a rotational rate which is substantially at or relatively close to one or more of the optimal or advantageous rotational rates. The control system is also preferably arranged and adapted to cause the motor and/or the pump to rotate at a rotational rate which is substantially different from or relatively far away from one or more of the sub-optimal or disadvantageous rotational rates.

According to an exemplary embodiment, the rotation rate or angular rate sensor preferably comprises an angular rate-sensing gyroscope or a micromachined mass attached to a frame. The rotation rate or angular rate sensor is preferably arranged and adapted to measure, in use, the rotation rate or angular rate by measuring the Coriolis force on one or more vibrating elements.

The apparatus preferably comprises a motor housing for housing the motor. The motor is preferably driven, in use, by drilling fluid and/or may be electrically powered. The apparatus preferably comprises a pump housing for housing the pump and an ESP gauge. The at least one sensor is preferably located in the ESP gauge. The motor housing is preferably located, in use, below the pump housing. The ESP gauge is preferably located, in use, below the motor housing. The at least one sensor is preferably arranged to determine the rotation rate and/or the rotational acceleration of the motor housing and/or the pump housing and/or the ESP gauge.

The Electrical Submersible Pump preferably comprises a housing wherein the at least one sensor is preferably arranged to determine the rotation rate and/or rotational acceleration of the housing.

According to an exemplary embodiment, the Electrical Submersible Pump comprises a rotation rate or angular rate sensor and/or a rotational acceleration sensor. However, other less preferred embodiments are contemplated wherein two preferably parallel translational accelerometers may be provided. One translational accelerometer may be arranged in a first orientation and the other translational accelerometer may be arranged in a second opposite or opposed orientation. The two translational accelerometers are preferably spaced apart from each other on opposite sides of the axis of rotation of the Electrical Submersible Pump. If the Electrical Submersible Pump is caused to rotate then the two translational accelerometers will preferably output equal and opposite translational acceleration signals. According to an embodiment the difference or differential between the signal output from the two translational accelerometers is preferably determined. This enables a measure of the rotational acceleration to be determined.

According to another aspect of the present invention there is provided apparatus comprising:

an Electrical Submersible Pump comprising a motor, a pump and two or more translational accelerometers;

means for producing a rotation rate or rotational acceleration signal from signals output from the two or more translational accelerometers, wherein the means determines a differential between or from the signals output from the two or more translational accelerometers; and a control and processing system which in a mode of operation is arranged and adapted:

(i) to accelerate the motor and/or the pump and then determine the direction of rotation of the motor and/or the pump; and (ii) to decelerate the motor and/or the pump and then determine the direction of rotation of the motor and/or the pump.

According to another aspect of the present invention there is provided apparatus comprising:

an Electrical Submersible Pump comprising a motor, a pump and two or more translational accelerometers;

means for producing a rotation rate or rotational acceleration signal from signals output from the two or more translational accelerometers, wherein the means determines a differential between or from the signals output from the two or more translational accelerometers;

a control system which is arranged and adapted to change, vary, sweep or scan the rotational rate of the motor and/or the pump; and a processing system which determines in use:

(i) one or more optimal or advantageous rotational rates for the motor and/or the pump from the rotation rate or rotational acceleration signal; and/or (ii) one or more sub-optimal or disadvantageous rotational rates for the motor and/or the pump from the rotation rate or rotational acceleration signal.

At least a part or substantially the whole of the processing system is preferably located, in use, downhole. Additionally or alternatively, at least a part or substantially the whole of the processing system may be located, in use, at a surface location.

The apparatus preferably further comprises one or more electrical power cables arranged between a surface location and the Electrical Submersible Pump. In a mode of operation data is preferably transmitted to and/or from the processing system via the one or more electrical power cables. The apparatus may further comprise one or more optical fibres or optical communication channels arranged between a surface location and the Electrical Submersible Pump. In a mode of operation data may be transmitted to and/or from the processing system via the one or more optical fibres or optical communication channels.

According to another aspect of the present invention there is provided downhole production apparatus comprising apparatus as described above and further comprising production tubing suspended in a well. The Electrical Submersible Pump is preferably attached to the production tubing and the Electrical Submersible Pump is preferably arranged to pump produced fluids to a surface location.

According to another aspect of the present invention there is provided a method comprising:

providing an Electrical Submersible Pump comprising a motor, a pump and at least one sensor, wherein the at least one sensor comprises a rotation rate or angular rate sensor and/or a rotational acceleration sensor; and determining an initial direction of rotation of the motor and/or the pump from a signal output from the at least one sensor.

The initial direction of rotation of the motor and/or the pump is preferably determined automatically. However, other embodiments are contemplated wherein a manual determination of the initial direction of rotation may be made.

According to another aspect of the present invention there is provided a method comprising:

providing an Electrical Submersible Pump comprising a motor, a pump and at least one sensor, wherein the at least one sensor comprises a rotation rate or angular rate sensor and/or a rotational acceleration sensor; and determining the rotational noise or one or more measures of the rotational noise of the motor and/or the pump from a signal output from the at least one sensor.

The rotational noise or one or more measures of the rotational noise of the motor and/or the pump is preferably determined automatically. However, other embodiments are contemplated wherein a manual determination of the rotational noise or one or more measures of the rotational noise of the motor and/or the pump may be made.

According to another aspect of the present invention there is provided a method comprising:

providing an Electrical Submersible Pump comprising a motor, a pump and at least one sensor, wherein the at least one sensor comprises a rotation rate or angular rate sensor and/or a rotational acceleration sensor;

accelerating the motor and/or the pump and then determining the direction of rotation of the motor and/or the pump;

decelerating the motor and/or the pump and then determining the direction of rotation of the motor and/or the pump;

wherein either: (i) the step of accelerating the motor and/or the pump is performed prior to the step of decelerating the motor and/or the pump; or (ii) the step of decelerating the motor and/or the pump is performed prior to the step of accelerating the motor and/or the pump.

The method preferably further comprises determining, confirming or verifying the direction of rotation of the motor and/or the pump. This step may be performed manually or automatically.

According to an exemplary embodiment, the steps of accelerating and decelerating the motor and/or the pump and then determining the direction of rotation of the motor and/or the pump is preferably performed automatically. However, other embodiments are contemplated wherein the steps may be performed manually.

According to another aspect of the present invention there is provided a method comprising:

providing an Electrical Submersible Pump comprising a motor, a pump and at least one sensor, wherein the at least one sensor comprises a rotation rate or angular rate sensor and/or a rotational acceleration sensor;

changing, varying, sweeping or scanning the rotational rate of the motor and/or the pump; and determining one or more optimal or advantageous rotational rates for the motor and/or the pump from a signal output from the at least one sensor and/or determining one or more sub-optimal or disadvantageous rotational rates for the motor and/or the pump from a signal output from the at least one sensor.

According to an exemplary embodiment, the step of changing, varying, sweeping or scanning the rotational rate of the motor and/or the pump is performed automatically. However, other embodiments are contemplated wherein the step is performed manually.

According to an exemplary embodiment, the steps of determining one or more optimal or advantageous rotational rates for the motor and/or the pump from a signal output from the at least one sensor and/or determining one or more sub-optimal or disadvantageous rotational rates for the motor and/or the pump from a signal output from the at least one sensor are performed automatically. However, other embodiments are contemplated wherein the step(s) are performed manually.

The method preferably further comprises causing the motor and/or the pump to rotate at a rotational rate which is substantially at or relatively close to one or more of the optimal or advantageous rotational rates. The method may further comprise causing the motor and/or the pump to rotate at a rotational rate which is substantially different from or relatively far away from one or more of the sub-optimal or disadvantageous rotational rates. These steps may be performed automatically or manually.

According to another aspect of the present invention there is provided a method comprising:

providing an Electrical Submersible Pump comprising a motor, a pump and two or more translational accelerometers;

producing a rotation rate or rotational acceleration signal from signals output from the two or more translational accelerometers by determining a differential between or from the signals output from the two or more translational accelerometers; and determining either: (i) an initial direction of rotation of the motor and/or the pump from the rotation rate or rotational acceleration signal; and/or (ii) the rotational noise or one or more measures of the rotational noise of the motor and/or the pump from the rotation rate or rotational acceleration signal.

According to another aspect of the present invention there is provided a method comprising:

providing an Electrical Submersible Pump comprising a motor, a pump and two or more translational accelerometers;

producing a rotation rate or rotational acceleration signal from signals output from the two or more translational accelerometers by determining a differential between or from the signals output from the two or more translational accelerometers;

accelerating the motor and/or the pump and then determining the direction of rotation of the motor and/or the pump; and decelerating the motor and/or the pump and then determining the direction of rotation of the motor and/or the pump.

The accelerating step may be performed before or after the decelerating step. The direction of rotation of the motor and/or the pump is left unchanged when the motor and/or pump are accelerated and decelerated.

According to another aspect of the present invention there is provided a method comprising:

providing an Electrical Submersible Pump comprising a motor, a pump and two or more translational accelerometers;

producing a rotation rate or rotational acceleration signal from signals output from the two or more translational accelerometers by determining a differential between or from the signals output from the two or more translational accelerometers;

changing, varying, sweeping or scanning the rotational rate of the motor and/or the pump; and determining one or more optimal or advantageous rotational rates for the motor and/or the pump from the rotation rate or rotational acceleration signal and/or determining one or more sub-optimal or disadvantageous rotational rates for the motor and/or the pump from the rotation rate or rotational acceleration signal.

According to another aspect of the present invention there is provided a method as described above, further comprising suspending production tubing in a well. The Electrical Submersible Pump is preferably attached to the production tubing. The Electrical Submersible Pump is preferably arranged to pump produced fluids to a surface location.

As with the exemplary embodiment, described above, which utilises a rotation rate or angular rate sensor or a rotational acceleration sensor, the various steps of the less preferred embodiment described above which utilises two or more translational accelerometers may be performed either automatically or manually. Furthermore, the various preferred features described above in relation to the exemplary embodiment (wherein a rotation rate or angular rate sensor or a rotational acceleration sensor is utilised) are equally applicable to the less preferred embodiment (wherein two or more translational accelerometers are utilised) but are not repeated for reasons of economy.

According to an embodiment a rotation rate or angular rate sensor is preferably provided inside an ESP gauge of an Electrical Submersible Pump assembly. The rotation rate or angular rate sensor is preferably sensitive to the rotational speed or angular rate of rotation of the ESP gauge. The output from the sensor preferably enables the rotational direction of the motor and/or the pump of the Electrical Submersible Pump to be determined. When an Electrical Submersible Pump is started, the rotating elements of the Electrical Submersible Pump will rotate in a first direction (or sense) whilst the static elements of the Electrical Submersible Pump and the associated ESP gauge housing will twist in a second direction (or sense) which is opposite to the first direction (or sense). The small rotational movement of the ESP gauge housing is preferably sensed by the rotation rate or angular rate sensor and is used to determine the initial direction of rotation of the motor and pump.

The rotation rate or angular rate sensor is preferably relatively insensitive to translational accelerations (unlike an accelerometer which is designed to measure translational vibrations or accelerations). The rotation rate or angular rate sensor is, however, preferably very sensitive to rotational speed.

According to a less preferred embodiment the signal output from the rotation rate or angular rate sensor may be differentiated to give a measure of the rotational acceleration of the ESP housing and/or the motor and/or the pump.

According to another less preferred embodiment a rotational acceleration sensor may be used to monitor the ESP housing and/or the motor and/or the pump. The rotational acceleration sensor is preferably sensitive to rotational acceleration about a particular designated axis.

According to an exemplary embodiment, the rotation rate or angular rate sensor is preferably installed inside an ESP gauge which is preferably attached to the motor section of an Electrical Submersible Pump. The rotation rate or angular rate sensor is preferably firmly or rigidly connected to the housing of the ESP gauge. Accordingly, the sensor is preferably arranged to detect any rotation of the ESP gauge about the rotational axis of the Electrical Submersible Pump. Any changes in the loading of the pump section of the Electrical Submersible Pump or any changes in the motor torque of the Electrical Submersible Pump will preferably result in relatively small rotational movements in the housing of the Electrical Submersible Pump. These relatively small rotational movements are preferably transmitted to the housing of the ESP gauge since the ESP gauge is preferably connected securely to the motor section of the Electrical Submersible Pump. As a result, any rotational movement of the ESP gauge will preferably be transmitted to the rotation rate or angular rate sensor and will preferably be detected by the rotation rate or angular rate sensor.

The motor and pump sections of the Electrical Submersible Pump and the associated ESP gauge are preferably located inside an oilwell in such a way that they can twist by small amounts about the axis of the well. Accordingly, small rotational movements of the Electrical Submersible Pump and the ESP gauge housing can be detected by the rotation rate or angular rate sensor. The magnitude of the rotational movements will be a function of the torque changes in the Electrical Submersible Pump, the mass of the Electrical Submersible Pump housing, the mechanical compliance of the tubing holding the Electrical Submersible Pump in the oilwell and the friction between the Electrical Submersible Pump and the well casing. The preferred signal processing system is preferably designed to work on trends and changes in the rotational rate rather than upon absolute values.

An important aspect of the exemplary embodiment is the use of pattern recognition to interpret the information or data output from the rotation rate or angular rate sensor in the ESP gauge since there may not be the communications bandwidth available to transmit relatively high frequency high data content signals from the ESP gauge to the surface. Accordingly, information relating to whether or not there has been a motor start and, if so, in which direction the motor has started rotating is preferably captured by the ESP gauge and is preferably sent up to the surface as a simple set of numbers each time the ESP gauge updates (which may be, for example, once every 30 to 60 seconds).

The signal processing system within the ESP gauge is preferably designed bearing in mind that a very limited bandwidth is likely to be available for the ESP gauge to transmit data to the surface. The rotation rate or angular rate sensor is preferably continuously and rapidly sampled within the ESP gauge. However, only a few numbers are preferably transmitted to the surface every minute or so.

According to one embodiment three numbers may be transmitted to the surface every time the ESP gauge transmits data to the surface. The first number preferably indicates general rotational vibration levels during the period since the last transmission of data to the surface. The second number preferably indicates either a clockwise (CW) or counter clockwise (CCW) change in the direction of rotation of the motor and pump. Clockwise and counter clockwise are arbitrarily specified as viewed from the bottom of the Electrical Submersible Pump. The second number may, alternatively, indicate the detection of no direction change. The third number preferably indicates a quality factor which preferably reflects the level of confidence in the second number or parameter.

The direction (or sense) of rotation of the Electrical Submersible Pump may, according to one embodiment, be determined whenever the speed of the Electrical Submersible Pump is changed from the surface. For example, during a motor start the rotational speed of the pump is changed from zero to a non-zero value. During this period of rotational acceleration of the rotating elements of the Electrical Submersible Pump, a net torque will be coupled into the tubing supporting the Electrical Submersible Pump. The net torque will cause the Electrical Submersible Pump initially to twist or kick in a particular direction. If the Electrical Submersible Pump is started in the opposite direction then the net torque and hence the resulting kick will initially be in the opposite direction. According to an exemplary embodiment, the kick is preferably detected by the rotation rate or angular rate sensor and the initial direction of rotation of the motor and pump is preferably determined.

According to an exemplary embodiment, only the initial kick is preferably taken to be a reliable indicator of the starting direction or the direction of rotation of the Electrical Submersible Pump. After the initial kick, the Electrical Submersible Pump may twist back in the opposite direction due to a restoring force from the twisted tubing. Furthermore, the Electrical Submersible Pump may subsequently oscillate depending upon the dynamics of how the Electrical Submersible Pump is situated and attached to the tubing in the well bore.

The Electrical Submersible Pump is preferably driven by a variable speed drive from the surface. According to an embodiment, an operator or an automatic control system may adjust the rotational speed of the Electrical Submersible Pump away from any particular speed which may cause or result in a relatively high level of vibration being experienced by the downhole Electrical Submersible Pump. Relatively high levels of vibration may be caused, for example, by resonance effects. This approach advantageously enables the operating life of the Electrical Submersible Pump to be extended.

The direction of rotation of the Electrical Submersible Pump may be detected and/or confirmed according to an embodiment by using a variable speed drive which is preferably located at the surface. If the speed of the motor and/or the pump is stepped from one non-zero speed to another non-zero speed (c.f. from zero to a non-zero speed in the case of a motor start) then a net torque will also be experienced. The resulting kick can be detected in a similar manner which enables the direction of rotation of the downhole Electrical Submersible Pump to be determined and/or confirmed. This provides a particularly advantageous way of determining and/or confirming the direction of rotation of the motor and/or the pump without needing a motor start event and without needing to rotate the motor and/or the pump in the wrong direction. If an opposite direction kick is detected during a decrease in the rotational speed then there can be a high degree of confidence that the rotational direction of the motor and/or the pump has been correctly determined.

A motor or pump start-up event may be characterised by a period of relatively low rotational movement followed by a large and rapid increase in rotational movement in one direction. This can be detected using a downhole signal processing system according to an exemplary embodiment. The downhole signal processing system preferably scans the incoming data pattern from the rotation rate or angular rate sensor and preferably analyses the data pattern in small overlapping time slices. Each time slice is preferably scored, with the highest score preferably being given if there is a period of low movement followed by a high peak. When it is time to transmit the determined direction of rotation to the surface, the time-slice with the highest score is preferably selected and the direction and magnitude of the peak following the low vibration period is preferably transmitted to the surface as a number. It will be clear that variations of this approach can be adopted with modifications allowing the detection of direction between two rotational speeds.

One of the limiting factors in the design of an Electrical Submersible Pump and one of the critical failure modes is the motor shaft. The motor shaft is relatively long but has, due to space constraints, a relatively small diameter relative to the torque transmitted. Consequently, monitoring the rotational vibration of the Electrical Submersible Pump, according to an exemplary embodiment, is particularly advantageous as it enables an optimum operating speed for the Electrical Submersible Pump to be determined and/or selected. A particular problem is that rotational oscillations and resonance may occur in the motor, shaft and pump which can lead to rotational flexing of the shaft and hence premature failure of the motor and pump. Monitoring the rotational vibration of the motor, shaft and pump according to an embodiment of the present invention can give valuable additional diagnostic information.

According to an embodiment of the present invention an average value or a peak to peak value output from the rotation rate or angular rate sensor may additionally and/or alternatively be sent to the surface from time to time. This preferably allows the trend in rotational vibration to be observed or monitored. In particular, the average or peak level of rotational vibration at different rotational speeds can be observed or monitored so that an appropriate or optimum speed of rotation of the motor shaft and pump may be selected.

In the drawings and specification, there have been disclosed a typical preferred embodiments of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus to determine a direction of rotation of a motor and pump of an electrical submersible pump, comprising: an electrical submersible pump assembly including a motor, a pump, a housing, and at least one sensor positioned to measure a rotational rate; and a processing system being configured to determine a direction of rotation of the pump, the motor, or both the pump and the motor responsive to a signal output from the at least one sensor to thereby determine if the pump, the motor, or both the pump and the motor of the electrical submersible pump assembly is rotating in an intended direction, wherein the processing system is configured to determine whether the signal output from the at least one sensor indicates one or more values exceeding a first threshold and one or more values exceeding a second threshold; and wherein the first threshold is set at a first percentage above a maximum rotation rate detected during a time period, and the second threshold is set at a second percentage below a maximum negative rotation rate detected during the time period.

2. An apparatus as defined in claim 1, wherein the at least one sensor comprises an angular rate-sensing gyroscope positioned so that an axis of sensitivity of the gyroscope corresponds to a vertical axis of the electrical submersible pump assembly.

3. An apparatus as defined in claim 2, wherein the at least one sensor is configured to measure rotation rate by measuring a Coriolis force on one or more vibrating elements of the electrical submersible pump assembly.

4. An apparatus of claim 1, wherein the at least one sensor comprises a rotation rate sensor positioned to measure a rotational rate of the housing.

5. An apparatus as defined in claim 1, wherein the at least one sensor comprises an angular rate sensor positioned to measure a rotational rate of the housing.

6. An apparatus as defined in claim 1, wherein the at least one sensor comprises a rotational acceleration sensor positioned to measure a rotational rate of the housing.

7. An apparatus of claim 1, wherein the first percentage is between 1% and 50%, and the second percentage is between 1% and 50%.

8. An apparatus of claim 1,
wherein the processing system is configured to determine whether the signal output from the at least one sensor indicates one or more values exceeding a first threshold and whether the signal output from the at least one sensor indicates one or more values exceeding a second threshold; and
wherein the first threshold has, in a mode of operation, a positive value of between 1 deg/s and 15 deg/s, and the second threshold has, in the mode of operation, a negative value of between 1 deg/s and 15 deg/s.

9. An apparatus as defined in claim 1,
wherein the signal output is time-dependent;
wherein the processing system is configured to determine whether the signal output from the at least one sensor indicates a first value meeting or exceeding a first threshold and whether the signal output from the at least one sensor indicates a second value meeting or exceeding a second threshold; and
wherein the processing system is configured such that:
when the first value matching or exceeding the first threshold is reached before the second value matching or exceeding the second threshold is reached, the processing system determines a direction of rotation of the pump, the motor, or both the pump and the motor to be in a clockwise direction, and
when the second value matching or exceeding the second threshold is reached before the first value matching or exceeding the first threshold is reached, the processing system determines the direction of rotation of the pump, the motor, or both the pump and the motor to be in a counter-clockwise direction.

10. An apparatus as defined in claim 9, wherein the first threshold has a positive value related to a maximum positive value indicated by the signal output of the at least one sensor, and wherein the second threshold has a negative value related to a maximum negative value indicated by the signal output of the at least one sensor.

11. An apparatus as defined in claim 1,
wherein the signal output is time-dependent;
wherein the processing system is configured to determine whether the signal output from the at least one sensor indicates a first value matching or exceeding a first threshold and whether the signal output from the at least one sensor indicates a second value matching or exceeding a second threshold; and
wherein the processing system is configured such that:
when the first value matching or exceeding the first threshold is reached before the second value matching or exceeding the second threshold is reached, the processing system determines a direction of rotation of the pump, the motor, or both the pump and the motor to be in a counter-clockwise direction, and
when the second value matching or exceeding the second threshold is reached before the first value matching or exceeding the first threshold is reached, the processing system determines the direction of rotation of the pump, the motor, or both the pump and the motor to be in a clockwise direction.

12. An apparatus as defined in claim 11, wherein the first threshold has a positive value related to a maximum positive value indicated by the signal output of the at least one sensor, and wherein the second threshold has a negative value related to a maximum negative value indicated by the signal output of the at least one sensor.

13. An apparatus as defined in claim 1, wherein the processing system is further configured to determine one or more detection quality factors, and wherein each detection quality factor includes a ratio of a maximum detected rotation rate during a second time period T2 to a maximum detected rotation rate during a first time period T1 and a ratio of a maximum detected rotation rate during the second time period T2 to a maximum detected rotation rate during a third time period T3, wherein T3>T2>T1.

14. An apparatus to determine a direction of rotation of a motor and pump of an electrical submersible pump, comprising: an electrical submersible pump assembly including a motor, a pump, a housing, and at least one sensor positioned to measure a rotational rate; and a processing system being configured to perform the operations of: determining whether a time-dependent signal output from the at least one sensor indicates a first value matching or exceeding a first threshold and whether the time-dependent signal output from the at least one sensor indicates a second value matching or exceeding a second threshold, and determining a direction of rotation of the motor responsive to the time-dependent signal output from the at least one sensor to thereby determine if the pump, the motor, or both the pump and the motor of the electrical submersible pump assembly is rotating in an intended direction; and the processing system being further configured such that: when the time-dependent signal output from the at least one sensor indicates the first value matching or exceeding the first threshold is reached before the second value matching or exceeding the second threshold is reached, the processing system determines a direction of rotation of the pump, the motor, or both the pump and the motor to be in the intended direction, and when the time-dependent signal output from the at least one sensor indicates the second value matching or exceeding the second threshold is reached before the first value matching or exceeding the first threshold is reached, the processing system determines the direction of rotation of the pump, the motor, or both the pump and the motor to be in a direction opposite the intended direction; wherein the processing system is further configured to determine one or more detection quality factors, and wherein each detection quality factor includes a ratio of a maximum detected rotation rate during a second time period T2 to a maximum detected rotation rate during a first time period T1 and a ratio of a maximum detected rotation rate during the second time period T2 to a maximum detected rotation rate during a third time period T3, wherein T3>T2>T1.

15. An apparatus as defined in claim 14, wherein the first threshold has a positive value related to a maximum positive value indicated by the signal output of the at least one sensor, and wherein the second threshold has a negative value related to a maximum negative value indicated by the signal output of the at least one sensor.

16. An apparatus to determine a direction of rotation of a motor and pump of an electrical submersible pump, comprising: an electrical submersible pump assembly including a motor, a pump, a housing, and at least one sensor positioned to measure a rotational rate; and a processing system being configured to perform the operations of: determining whether a time-dependent signal output from the at least one sensor indicates a first value matching or exceeding a first threshold and whether the time-dependent signal output from the at least one sensor indicates a second value matching or exceeding a second threshold, and determining a direction of rotation of the motor responsive to the time-dependent signal output from the at least one sensor to thereby determine if the pump, the motor, or both the pump and the motor of the electrical submersible pump assembly is rotating in an intended direction; and the processing system being further configured such that: when the first value matching or exceeding the first threshold is reached before the second value matching or exceeding the second threshold is reached, the processing system determines a direction of rotation of the pump, the motor, or both the pump and the motor to be in a counter-clockwise direction, and when the second value matching or exceeding the second threshold is reached before the first value matching or exceeding the first threshold is reached, the processing system determines the direction of rotation of the pump, the motor, or both the pump and the motor to be in a clockwise direction, wherein the processing system is further configured to determine one or more detection quality factors, and wherein the detection quality factor includes a ratio of a maximum detected rotation rate during a second time period T2 to a maximum detected rotation rate during a first time period T1 and a ratio of a maximum detected rotation rate during the second time period T2 to a maximum detected rotation rate during a third time period T3, wherein T3>T2>T1.

17. An apparatus as defined in claim 16, wherein the first threshold has a positive value related to a maximum positive value indicated by the signal output of the at least one sensor, and wherein the second threshold has a negative value related to a maximum negative value indicated by the signal output of the at least one sensor.

* * * * *